United States Patent

Fleischman

4,054,370

[45] Oct. 18, 1977

[54] FULL-FOCUS EYEPIECE

[75] Inventor: Andor A. Fleischman, Northbrook, Ill.

[73] Assignee: Bell & Howell Company, Chicago, Ill.

[21] Appl. No.: 703,879

[22] Filed: July 9, 1976

[51] Int. Cl.$^2$ .................. G02B 25/00; G02B 13/16; G02B 9/34

[52] U.S. Cl. .................. 350/175 E; 350/220

[58] Field of Search ........................ 350/175 E, 220

[56] References Cited

U.S. PATENT DOCUMENTS 2,084,309  6/1937  Bertele ................... 350/220

FOREIGN PATENT DOCUMENTS 1,001,837  6/1951  France ................... 350/220

*Primary Examiner*—Conrad J. Clark
*Attorney, Agent, or Firm*—John E. Peele, Jr.

[57] ABSTRACT

An optical system for an eyepiece designed primarily to be used to observe an image formed by an optical instrument, such as an image intensifier, when viewing scenes under adverse or low light conditions. The system is designed with fewer elements than comparable designs of similar optical performance, and in the embodiments shown, five elements provide the required correction for high quality imaging of the viewed scene.

3 Claims, 17 Drawing Figures

F/5.30

F/7.57

25.61°

18.72°

F/5.30

F/7.57

25.61°

18.72°

FULL-FOCUS EYEPIECE

This invention relates to an optical system for an eyepiece of an optical instrument used primarily in viewing scenes under adverse and low light conditions. The optical design enables a lower manufacturing cost than designs for comparable optical correction and performance characteristics by using fewer elements including an air spaced meniscus element.

In the last few years, improvements have been made in optical designs of eyepiece lens to provide better optical corrections and greater light transmission capability. Generally, these improvements have resulted in more complex optical designs which were more expensive to manufacture, due to larger number of elements often requiring more expensive glasses and manufacturing procedures. However, because of the improved optical correction and performance characteristics, these designs were highly desirable,.

An improved eyepiece design of similar optical correction and performance characteristics is obtained with lower cost. The design is obtained by a novel combination of elements enabling fewer elements to be used with a corresponding reduction in raw material and manufacturing costs, but obtaining better optical performance and better light transmission. These advances result from a significantly different construction in which the last three elements are negative, positive, and negative in arrangement.

An object of the invention is to provide a highly corrected eyepiece for use under low light level conditions, the eyepiece having a relatively large effective aperture and being composed of five elements.

The above and other objects of the invention will be apparent by reference to the detailed description when taken in conjunction with the accompanying drawings.

Figure 1:
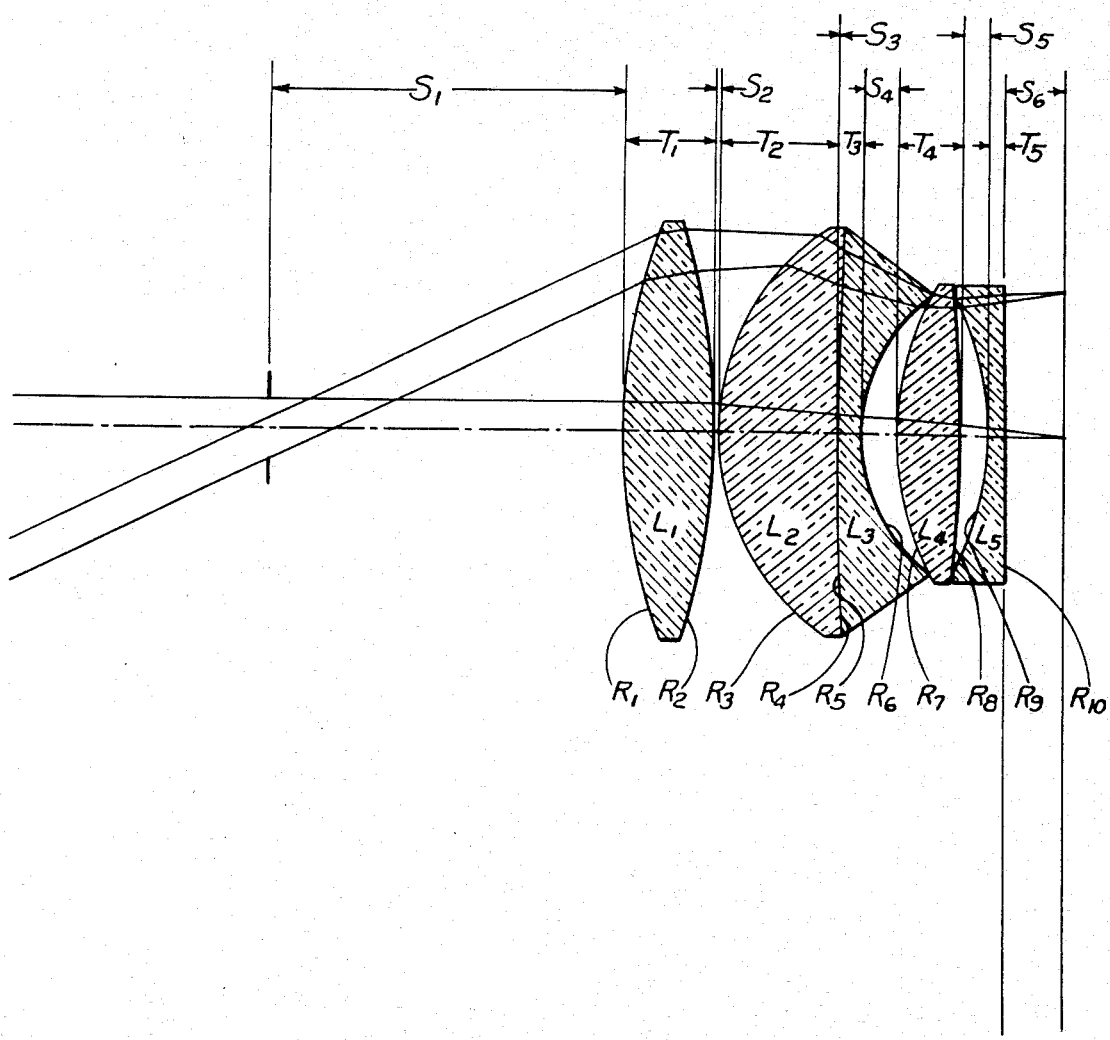
FIG. 1 is a diagrammatic view of a preferred form of the eyepiece optical system.

With reference to FIG. 1 of the drawings, a preferred form of the eyepiece optical system is shown. The system comprises five elements $L_1$ to $L_5$. The first element is a positive meniscus type element for receiving light rays passing through a stop from other optical components defining an objective lens for imaging a remote scene or object for viewing through the eyepiece. The element $L_1$ has the same radii on both surfaces enabling the element to be more economically manufactured than for an element having different radii.

The second element $L_2$ forms a component with element $L_3$. The element $L_2$ has steeply curved convex surface $R_3$ and a slightly negative curved opposite surface $R_4$ against which the forward surface $R_5$ of element $L_3$ is cemented. The latter element $L_3$ has a relatively steep negative surface $R_6$. A positive element $L_4$ is centrally air spaced from the element $L_3$ and the following element $L_5$. Element $L_3$ is a slightly negative element providing correction to the light rays which emerge from that element to enter element $L_5$. The latter element is a relatively thin negative element having a planar rear surface $R_{10}$. Through the eyepiece optical system, the user views the highly corrected image formed by an objective lens (not shown) or the exit face of an image intensifier (not shown). This significantly different eyepiece construction results in a greatly improved optical system.

Other embodiments of the eyepiece as described in the Tables, in addition to Table 1, have similar element configurations, arrangements, and spacings although specific radii, thicknesses and spacings and optical materials are different. Nevertheless, the concept of the optical design is similar.

The optical values of the eyepiece optical system of the preferred embodiment of FIG. 1 are as follows:

TABLE 1

EFL = 1.0431 inches (26.50mm)
Half Angle of Field = 25.61°

| Lens | Radii (in.) | Thickness (in.) | Spacing (in.) | V | $N_D$ |
|---|---|---|---|---|---|
| | | STOP | | | |
| | | | $S_1$ = 1.1810 | | |
| $L_1$ | $R_1$ = 2.173 | $T_1$ = 0.2758 | | 54.8 | 1.691 |
| | $R_2$ = 2.1730 | | $S_2$ = .0070 | | |
| $L_2$ | $R_3$ = 0.7640 | $T_2$ = 0.4140 | | 54.8 | 1.691 |
| | $R_4$ = −8.6130 | | $S_3$ = 0 | | |
| $L_3$ | $R_5$ = 8.6130 | $T_3$ = 0.0700 | | 25.4 | 1.805 |
| | $R_6$ = −0.5420 | | $S_4$ = .1160 | | |
| $L_4$ | $R_7$ = 0.8494 | $T_4$ = 0.2130 | | 51.7 | 1.734 |
| | $R_8$ = 3.8610 | | $S_5$ = .0840 | | |
| $L_5$ | $R_9$ = −0.9400 | $T_5$ = 0.0600 | | 25.4 | 1.805 |
| | $R_{10}$ = Inf. | | $S_6$ = .1885 BFL | | |

In the above table, the first column lists the lens elements $L_1$ to $L_5$ numerically, starting at the ray entrance side of the system. The second column lists the respective radii $R_1$ to $R_{10}$ of the elements. The third column lists in inches the thicknesses $T_1$ to $T_5$ of the respective elements. The fourth column lists the axial spacings (in inches) between the respective elements and the image plane at which the light rays are imaged for viewing. The fifth and sixth columns list respectively the dispersive index V and the refractive index $N_D$ of the optical materials. The EFL is the effective focal length of the optical system. The "Half Angle of Field" is one half the angle between the continuation of the lens axis and a line from the nodal point of the lens to the most oblique point imaged in the viewing field.

Tables 2 and 3 below represent alternative embodiments of the optical system similar to the system as set forth in Table 1. The general optical configuration is similar to that shown in FIG. 1, with differences of the elements in radii, thicknesses, spacings and optical material. By the selection of better and more expensive optical glass materials, the performance of the eyepiece is improved.

TABLE 2

EFL = 1.0433 inches (26.50mm)
Half Angle of Field = 25.61°

| Lens | Radii (in.) | Thickness (in.) | Spacing (in.) | V | $N_D$ |
|---|---|---|---|---|---|
| | | STOP | | | |
| | | | $S_1$ = 1.1810 | | |
| $L_1$ | $R_1$ = 2.1391 | $T_1$ = .2900 | | 54.8 | 1.691 |

TABLE 2-continued

EFL = 1.0433 inches (26.50mm)
Half Angle of Field = 25.61°

| Lens | Radii (in.) | Thickness (in.) | Spacing (in.) | V | $N_D$ |
|---|---|---|---|---|---|
| $L_2$ | $R_2 = 2.1391$<br>$R_3 = 0.7732$ | $T_2 = .4013$ | $S_2 = .0070$ | 54.8 | 1.691 |
| $L_3$ | $R_4 = -11.0296$<br>$R_5 = 11.0296$ | $T_3 = .0700$ | $S_3 = 0$ | 25.4 | 1.805 |
| $L_4$ | $R_6 = -0.5558$<br>$R_7 = .9058$ | $T_4 = .2202$ | $S_4 = .1160$ | 50.5 | 1.788 |
| $L_5$ | $R_8 = 6.0374$<br>$R_9 = -0.9763$ | $T_5 = .0600$ | $S_5 = .0903$ | 25.4 | 1.805 |
| | $R_{10} = $ Inf. | | $S_6 = .1892$<br>BFL | | |

TABLE 3

EFL = 1.0433 inches (26.50mm)
Half Angle of Field = 25.61°

| Lens | Radii (in.) | Thickness (in.) | Spacing (in.) | V | $N_D$ |
|---|---|---|---|---|---|
| | STOP | | $S_1 = 1.1810$ | | |
| $L_1$ | $R_1 = 2.1372$ | $T_1 = .2900$ | | 54.8 | 1.691 |
| $L_2$ | $R_2 = 2.1372$<br>$R_3 = 0.7453$ | $T_2 = .3820$ | $S_2 = .0070$ | 54.8 | 1.691 |
| $L_3$ | $R_4 = -3.0776$<br>$R_5 = 3.0776$ | $T_3 = .0700$ | $S_3 = 0$ | 23.8 | 1.847 |
| $L_4$ | $R_6 = -0.5473$<br>$R_7 = .8695$ | $T_4 = .2253$ | $S_4 = .1172$ | 50.5 | 1.788 |
| $L_5$ | $R_8 = 6.5074$<br>$R_9 = -0.9568$ | $T_5 = .0600$ | $S_5 = .0934$ | 23.8 | 1.847 |
| | $R_{10} = $ Inf. | | $S_6 = .1894$<br>BFL | | |

FIGS. 2a to 2h graphically represent various aberrations related to the form of the optical system as shown schematically in FIG. 1 and having the design data recited in Table 1.

Figure 2A:
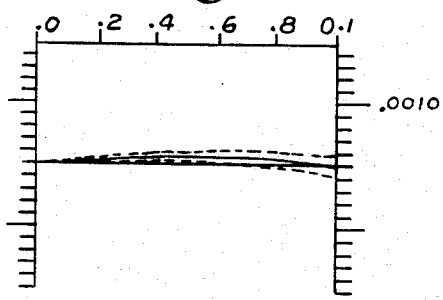
FIGS. 2a to 2h are graphical representations of the various aberrations of the lens system shown in FIG. 1 and having the design data given in Table 1.
Figure 2B:
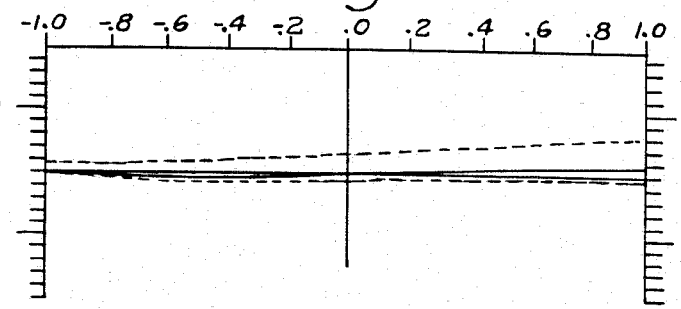
Figure 2D:
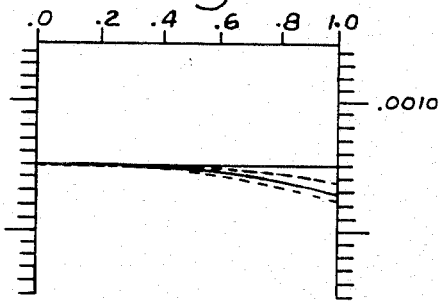
Figure 2C:
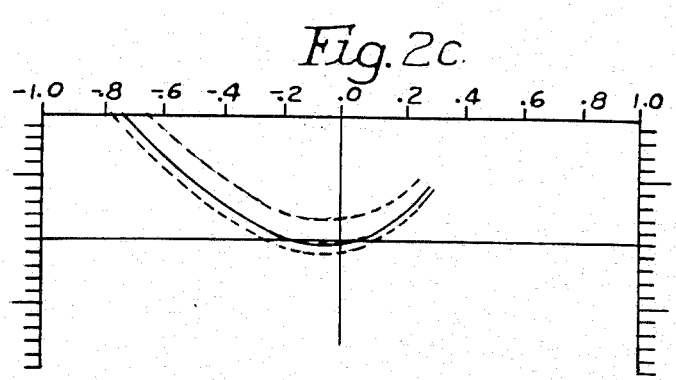
Figure 2E:
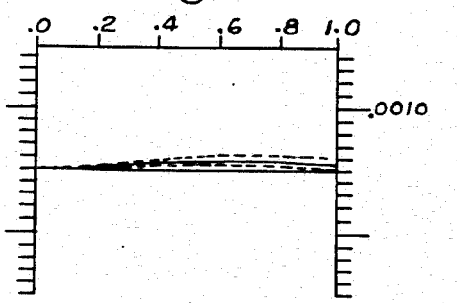
Figure 2F:
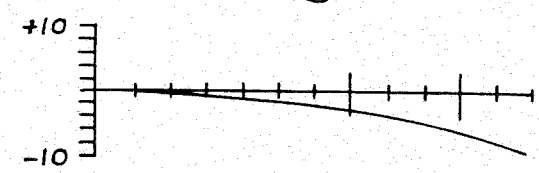
Figure 2G:
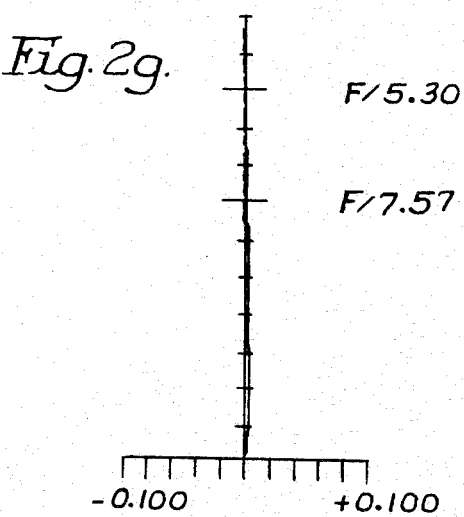
Figure 2H:
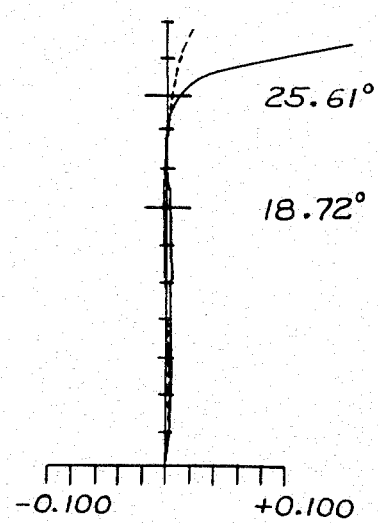
Figure 3A:
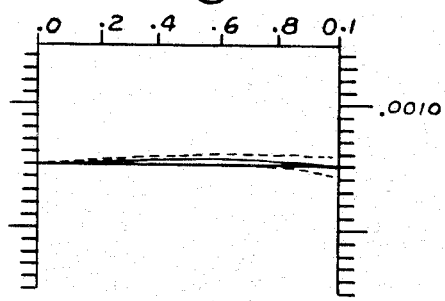
FIGS. 3a to 3h are graphical representations of the various aberrations of the lens system similar in configuration to the system shown in FIG. 1, and having the design data given in Table 2.
Figure 3B:
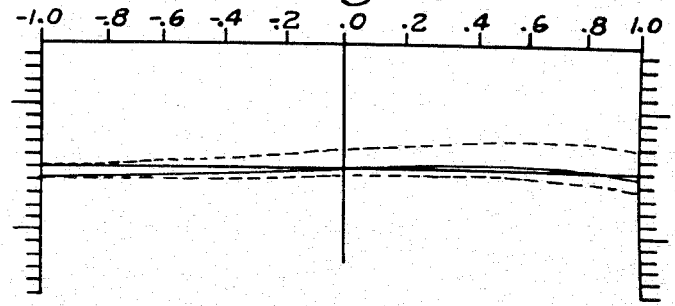
Figure 3D:
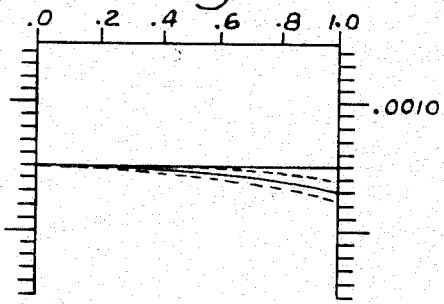
Figure 3C:
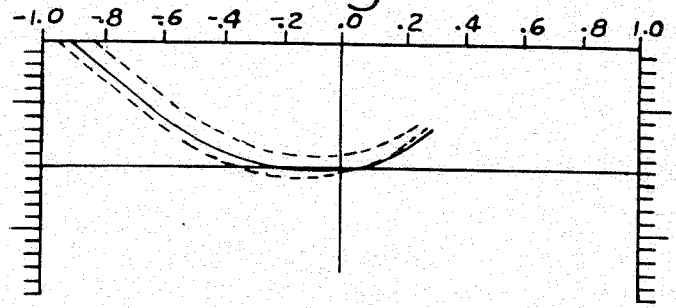
Figure 3E:
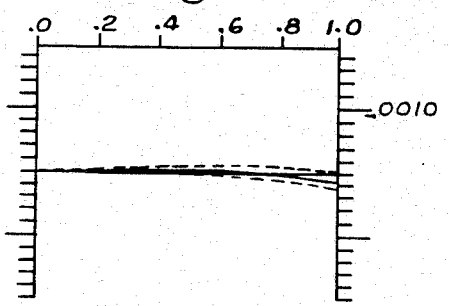
Figure 3F:
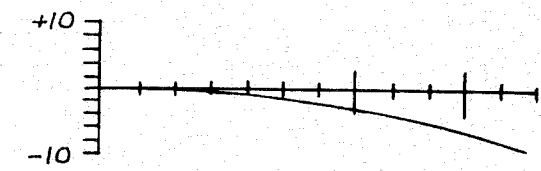
Figure 3G:
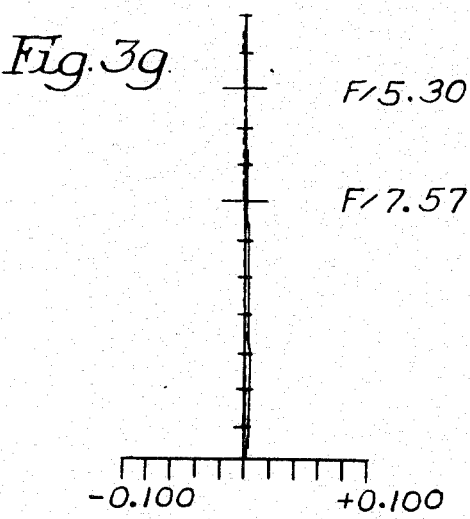
Figure 3H:
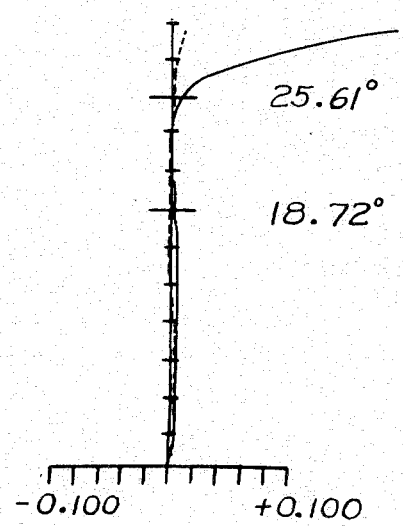

FIG. 2a represents axial chromatic correction of three typical wavelengths forming rays on axis and lateral. FIG. 2b represents off axis aberrations of rays passing from the zone of the image format and through the lens transversely and tangentially. FIG. 2c represents the aberrations of the rays passing from the corner of the image format through the lens tangentially and transversely. FIG. 2d represents the radial or longitudinal aberration from the zone of the image format of rays entering the lens at 3 o'clock, while FIG. 2e represents similar aberrations from full field or corner rays. FIG. 2f represents distortion as a percentage of a "perfect" image. FIG. 2g represents the spherical aberration by a full line and the offense-against-sine-condition by the dotted line. FIG. 2h represents the curvature of field with the tangential curvature being shown in full line and the sagittal curvature being shown in dashed lines.

FIGS. 3a to 3h represent similar aberrations, as above recited, related to the optical system of Table 2. Since the aberrations of the optical system of Table 3 are very similar to those of the systems of Tables 1 and 2, the representations are not deemed necessary for an evaluation of the optical design.

What is claimed is:

1. An optical system for an eyepiece, having substantially the following specifications::

EFL = 1.0431 inches (26.50mm)
Half Angle of Field = 25.61°

| Lens | Radii (in.) | Thickness (in.) | Spacing (in.) | V | $N_D$ |
|---|---|---|---|---|---|
| | STOP | | $S_1 = 1.1810$ | | |
| $L_1$ | $R_1 = 2.173$<br>$R_2 = 2.1730$ | $T_1 = 0.2758$ | | 54.8 | 1.691 |
| $L_2$ | $R_3 = 0.7640$<br>$R_4 = -8.6130$ | $T_2 = 0.4140$ | $S_2 = .0070$ | 54.8 | 1.691 |
| $L_3$ | $R_5 = 8.6130$<br>$R_6 = -0.5420$ | $T_3 = 0.0700$ | $S_3 = 0$ | 25.4 | 1.805 |
| $L_4$ | $R_7 = 0.8494$<br>$R_8 = 3.8610$ | $T_4 = 0.2130$ | $S_4 = .1160$ | 51.7 | 1.734 |
| $L_5$ | $R_9 = -0.9400$<br>$R_{10} = $ Inf. | $T_5 = 0.0600$ | $S_5 = .0840$ | 25.4 | 1.805 |
| | | | $S_6 = .1885$<br>BFL | | | wherein the first column lists the lens elements $L_1$ to $L_5$ numerically, starting at the ray entrance side of the system. The second column lists the respective radii $R_1$ to $R_{10}$ of the elements, the third column lists in inches the thicknesses $T_1$ to $T_5$ of the respective elements, the fourth column lists the axial spacings (in inches) between the respective elements and the image plane at which the light rays are imaged for viewing, and the fifth and sixth columns list respectively the dispersive index V and the refractive index $N_D$ of the optical materials.

2. An optical system for an eyepiece, having substantially the following specifications:

EFL = 1.0433 inches (26.50mm)
Half Angle of Field = 25.61°

| Lens | Radii (in.) | Thickness (in.) | Spacing (in.) | V | $N_D$ |
|---|---|---|---|---|---|
| | STOP | | $S_1 = 1.1810$ | | |
| $L_1$ | $R_1 = 2.1391$ | $T_1 = .2900$ | | 54.8 | 1.691 |
| $L_2$ | $R_2 = 2.1391$<br>$R_3 = 0.7732$ | $T_2 = .4013$ | $S_2 = .0070$ | 54.8 | 1.691 |
| $L_3$ | $R_4 = -11.0296$<br>$R_5 = 11.0296$ | $T_3 = .0700$ | $S_3 = 0$ | 25.4 | 1.805 |
| $L_4$ | $R_6 = -0.5558$<br>$R_7 = .9058$ | $T_4 = .2202$ | $S_4 = .1160$ | 50.5 | 1.788 |
| $L_5$ | $R_8 = 6.0374$<br>$R_9 = -0.9763$ | $T_5 = .0600$ | $S_5 = .0903$ | 25.4 | 1.805 |
| | $R_{10} = $ Inf. | | $S_6 = .1892$<br>BFL | | | wherein the first column lists the lens elements $L_1$ to $L_5$ numerically, starting at the ray entrance side of the system, the second column lists the respective radii $R_1$ to $R_{10}$ of the elements, the third column lists in inches the thicknesses $T_1$ to $T_5$ of the respective elements, the fourth column lists the axial spacings (in inches) between the respective elements and the image plane at which the light rays are imaged for viewing, the fifth and sixth columns list respectively the dispersive index V and the refractive index $N_D$ of the optical materials.

3. An optical system for an eyepiece, having substantially the following specifications:

| | EFL = 1.0433 inches (26.50mm) Half Angle of Field = 25.61° | | | |
|---|---|---|---|---|
| Lens Radii (in.) | Thickness (in.) | Spacing (in.) | V | $N_D$ |
| | | STOP | | |
| | | $S_1 = 1.1810$ | | |
| $L_1$  $R_1 = 2.1372$ | | | | |
| | $T_1 = .2900$ | | 54.8 | 1.691 |
| $R_2 = 2.1372$ | | | | |
| | | $S_2 = .0070$ | | |
| $L_2$  $R_3 = 0.7453$ | | | | |
| | $T_2 = .3820$ | | 54.8 | 1.691 |
| $R_4 = -3.0776$ | | | | |
| | | $S_3 = 0$ | | |
| $L_3$  $R_5 = 3.0776$ | | | | |
| | $T_3 = .0700$ | | 23.8 | 1.847 |
| $R_6 = -0.5473$ | | | | |
| | | $S_4 = .1172$ | | |
| $L_4$  $R_7 = .8695$ | | | | |
| | $T_4 = .2253$ | | 50.5 | 1.788 |
| $R_8 = 6.5074$ | | | | |

-continued

| | EFL = 1.0433 inches (26.50mm) Half Angle of Field = 25.61° | | | |
|---|---|---|---|---|
| Lens Radii (in.) | Thickness (in.) | Spacing (in.) | V | $N_D$ |
| | | $S_5 = .0934$ | | |
| $L_5$  $R_9 = -0.9568$ | | | | |
| | $T_5 = .0600$ | | 23.8 | 1.847 |
| $R_{10} = $ Inf. | | | | |
| | | $S_6 = .1894$ | | |
| | | BFL | | | wherein the first column lists the lens elements $L_1$ to $L_5$ numerically, starting at the ray entrance side of the system, the second column lists the respective radii $R_1$ to $R_{10}$ of the elements, the third column lists in inches the thicknesses $T_1$ to $T_5$ of the respective elements, the fourth column lists the axial spacings (in inches) between the respective elements and the image plane at which the light rays are imaged for viewing, and the fifth and sixth columns list respectively the dispersive index V and the refractive index $N_D$ of the optical materials.

* * * * *